(12) United States Patent
Ueno (10) Patent No.: US 10,843,373 B2
(45) Date of Patent: Nov. 24, 2020

(54) SHEET MANUFACTURING APPARATUS, SHEET MANUFACTURING METHOD, RESIN POWDER, AND SHEET

(71) Applicant: SEIKO EPSON CORPORATION, Tokyo (JP)

(72) Inventor: Yoshihiro Ueno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 15/741,037

(22) PCT Filed: Jun. 24, 2016

(86) PCT No.: PCT/JP2016/003046
§ 371 (c)(1),
(2) Date: Dec. 29, 2017

(87) PCT Pub. No.: WO2017/006533
PCT Pub. Date: Jan. 12, 2017

(65) Prior Publication Data
US 2018/0169892 A1 Jun. 21, 2018

(30) Foreign Application Priority Data

Jul. 3, 2015 (JP) ................................ 2015-134134

(51) Int. Cl.
*D21H 17/53* (2006.01)
*D21H 21/18* (2006.01)
(Continued)

(52) U.S. Cl.
CPC ................ *B27N 3/04* (2013.01); *B27N 3/12* (2013.01); *B27N 3/14* (2013.01); *D04H 1/60* (2013.01);
(Continued)

(58) Field of Classification Search
CPC ... B27N 3/04; B27N 3/12; B27N 3/14; B27N 3/002; B27N 3/02; D21H 17/53;
(Continued)

(56) References Cited

U.S. PATENT DOCUMENTS 6,475,690 B2 * 11/2002 Anno ..................... G03G 9/087
430/108.1
9,776,365 B2 * 10/2017 Higuchi .................. B29C 43/34
(Continued)

FOREIGN PATENT DOCUMENTS

JP 09-019907 A 1/1997
JP 2003-91099 * 3/2003
(Continued)

OTHER PUBLICATIONS

JP 2003-91099, English language machine translation [www.epo.org] (Year: 2003).*
(Continued)

*Primary Examiner* — Eric Hug
(74) *Attorney, Agent, or Firm* — Global IP Counselors, LLP (57) ABSTRACT

A sheet manufacturing apparatus according to the invention has a mixing unit that mixes fiber and resin powder in air; and a sheet forming unit that forms a sheet by laying and heating the mixture mixed by the mixing unit; the grindability index of the resin contained in the resin powder being 0.8 or less.

3 Claims, 1 Drawing Sheet

(51) Int. Cl.
*D21H 21/50* (2006.01)
*B27N 3/04* (2006.01)
*B27N 3/12* (2006.01)
*D04H 1/60* (2006.01)
*D04H 1/732* (2012.01)
*B27N 3/14* (2006.01)
*D04H 1/736* (2012.01)
*B32B 5/16* (2006.01)
*B32B 17/06* (2006.01)

(52) U.S. Cl.
CPC .............. *D04H 1/732* (2013.01); *D04H 1/736* (2013.01); *D21H 17/53* (2013.01); *D21H 21/18* (2013.01); *D21H 21/50* (2013.01); *B32B 5/16* (2013.01); *B32B 17/067* (2013.01)

(58) Field of Classification Search
CPC ........ D21H 21/18; D21H 21/50; D04H 1/732; D04H 1/736; D04H 1/60
See application file for complete search history.

(56) References Cited

U.S. PATENT DOCUMENTS

| | | | | |
|---|---|---|---|---|
| 9,849,634 B2* | 12/2017 | Ueno | ...................... | B29C 70/06 |
| 9,868,854 B2* | 1/2018 | Ueno | ...................... | D04H 1/587 |
| 2016/0229093 A1* | 8/2016 | Gomi | ...................... | D04H 1/732 |
| 2016/0230320 A1* | 8/2016 | Ueno | ....................... | D04H 1/60 |

FOREIGN PATENT DOCUMENTS

| | | | | |
|---|---|---|---|---|
| WO | 2015/049821 A1 | 4/2015 | | |
| WO | WO 2015/049821 | * | 4/2015 | ............... D04H 1/60 |
| WO | WO 2015/059846 | * | 4/2015 | ............. D04H 1/732 |

OTHER PUBLICATIONS

The Extended European Search Report for the corresponding European Patent Application No. 16821012.8 dated Feb. 19, 2019.

* cited by examiner

SHEET MANUFACTURING APPARATUS, SHEET MANUFACTURING METHOD, RESIN POWDER, AND SHEET

TECHNICAL FIELD

The present invention relates to a sheet manufacturing apparatus, a sheet manufacturing method, a sheet made by the apparatus and method, and a resin powder used in the same.

BACKGROUND

Products in the form of a sheet or film have been made for centuries by compiling fiber material and then creating bonds between adjoining fibers. Paper made in a slurry (screening) method using water is a typical example. The slurry method is still a common method of making paper. Paper made by the slurry method is generally manufactured by interlocking cellulose fibers derived from wood and using a binder (such as starch glue, water-based resin) to form bonds between fibers.

However, because the slurry method is a wet method, it requires a large amount of water, requires dewatering and drying after the paper is formed, and therefore requires a large amount of energy and time. The water must then be appropriately processed as waste water. Meeting the growing desire for reduced energy consumption and environmental protection has therefore become increasingly difficult. Equipment used in the slurry method also requires large-scale utilities and infrastructure to meet the water, electricity, and waste water treatment needs, and reducing the size of the equipment is difficult. Methods that require little to no water, referred to as dry methods, are therefore desired as an alternative to making paper by the slurry method.

PTL 1 describes a recovered paperboard made by heating and compressing with a hot press a mixture of spongy recovered paper pulp, made by adding water to recovered paper pulp obtained by dry defibration, and a fibrous or powdered thermoplastic synthetic resin.

CITATION LIST

Patent Literature

[PTL 1] JP-A-H09-019907

SUMMARY OF INVENTION

Technical Problem

However, because paperboard and sheet products manufactured in a dry process use little or no water in production, creating hydrogen bonds between fibers is difficult, and using starch or other water-soluble paper strengtheners is difficult. Depending on the intended application (particularly paper containers and boxes), the strength (paper strength) of the paperboard or sheet may therefore be insufficient.

The mechanical strength of paperboard and sheet products manufactured in a dry process is primarily obtained by bonding (binding) fibers together with resin. When force sufficient to deform such sheets is applied, the sheet is thought to tear by the resin holding fibers together failing (breaking), separation of the resin-fiber bonds, or the fibers breaking.

Making the breakdown of resin connecting one fiber to another difficult is therefore thought to be an effective means of increasing the strength of the sheet. Based on this idea, we formed sheets using a variety of resins, and investigated the correlation between sheet strength and the physical properties of the resin. As a result, we discovered there is a correlation between the paper strength (mechanical strength) of a dry-process sheet and specific physical properties of the resin.

One objective of the several embodiments of the invention is to provide a sheet manufacturing apparatus and a sheet manufacturing method enabling manufacturing in a dry process a sheet with good mechanical strength, and a sheet resulting therefrom. An objective of another aspect of the invention is to provide a resin powder enabling manufacturing, in a dry process, a sheet with good mechanical strength.

Solution to Problem

The present invention is directed to solving at least part of the foregoing problem, and can be achieved by the embodiments or examples described below.

A sheet manufacturing apparatus according to an aspect of the invention has a mixing unit that mixes fiber and resin powder in air; and a sheet forming unit that forms a sheet by laying and heating the mixture mixed by the mixing unit;

the grindability index of the resin contained in the resin powder being 0.8 or less.

A sheet manufacturing apparatus according to the invention can make sheets using a resin powder containing resin with a grindability index of 0.8 or less. Because such resin is not easily broken by external force, breaking the resin is difficult even in the manufactured sheet. A sheet with good mechanical strength can therefore be made.

In the sheet manufacturing apparatus according to the invention, the resin may be a BPA-free polyester resin.

With the sheet manufacturing apparatus thus comprised, a low grindability index can easily be achieved, and the environmental impact of the manufactured sheets can be reduced.

In the sheet manufacturing apparatus according to the invention, the volume mean particle diameter of the resin powder is 20 μm or less.

The sheet manufacturing apparatus thus comprised can make sheets having a uniform distribution of resin in the sheet, and at least reduced variance in sheet strength. More specifically, the resin powder can easily intermix with and disperse between the fibers. Because the resin powder is light, it is less affected by gravity and separation from the web and sheet is more difficult.

A sheet manufacturing method according to an aspect of the invention includes:

a mixing step of mixing fiber and resin powder in air; and a sheet forming step of forming a sheet by laying and heating the mixture mixed in the mixing step;

the grindability index of the resin contained in the resin powder being 0.8 or less.

A sheet manufacturing method according to the invention enables making sheets using a resin powder containing resin with a grindability index of 0.8 or less. Because such resin is not easily pulverized by external force, breaking the resin is difficult even in the manufactured sheet. A sheet with good mechanical strength can therefore be made.

In the sheet manufacturing method according to the invention, the volume mean particle diameter of the resin powder may be 20 μm or less.

This sheet manufacturing apparatus can easily intermix and easily distribute the resin powder between fibers. Because the resin powder is light, it is less affected by gravity and separation from the web and sheet is more difficult. As a result, sheets with good strength and little variance in strength can be manufactured.

A resin powder according to an aspect of the invention is a resin powder for making sheets, the resin powder including a BPA-free polyester resin and having a grindability index of 0.8 or less.

This resin powder can be mixed with resin to form sheets, the formed sheets have good mechanical strength, and sheets with suppressed environmental impact can be made.

In the resin powder according to the invention the volume mean particle diameter of the resin powder may be 20 μm or less.

This resin powder can be used to make sheets with uniform mechanical strength.

A sheet according to an aspect of the invention contains fiber and a BPA-free polyester resin, the BPA-free polyester resin having a grindability index of 0.8 or less.

Because such sheets contain resin with a grindability index of 0.8 or less, mechanical strength is better than sheets made with the same amount of a different resin. Furthermore, because a BPA-free polyester resin is used, the so-called environmental impact is small.

DESCRIPTION OF EMBODIMENTS

Preferred embodiments of the invention are described below. The embodiments described below describe exemplary embodiments of the invention. The invention is not limited to the following examples, and includes variations thereof not departing from the scope of the accompanying claims. Note that embodiments of the invention do not necessarily require all configurations described below.

1. Sheet Manufacturing Apparatus

A sheet manufacturing apparatus according to this embodiment includes a mixer that mixes fiber and resin powder in air, and a sheet forming unit that forms a sheet by laying and heating the mixture mixed by the mixer, the grindability index of the resin contained in the resin powder being 0.8 or less.

1.1. Configuration

Figure 1:
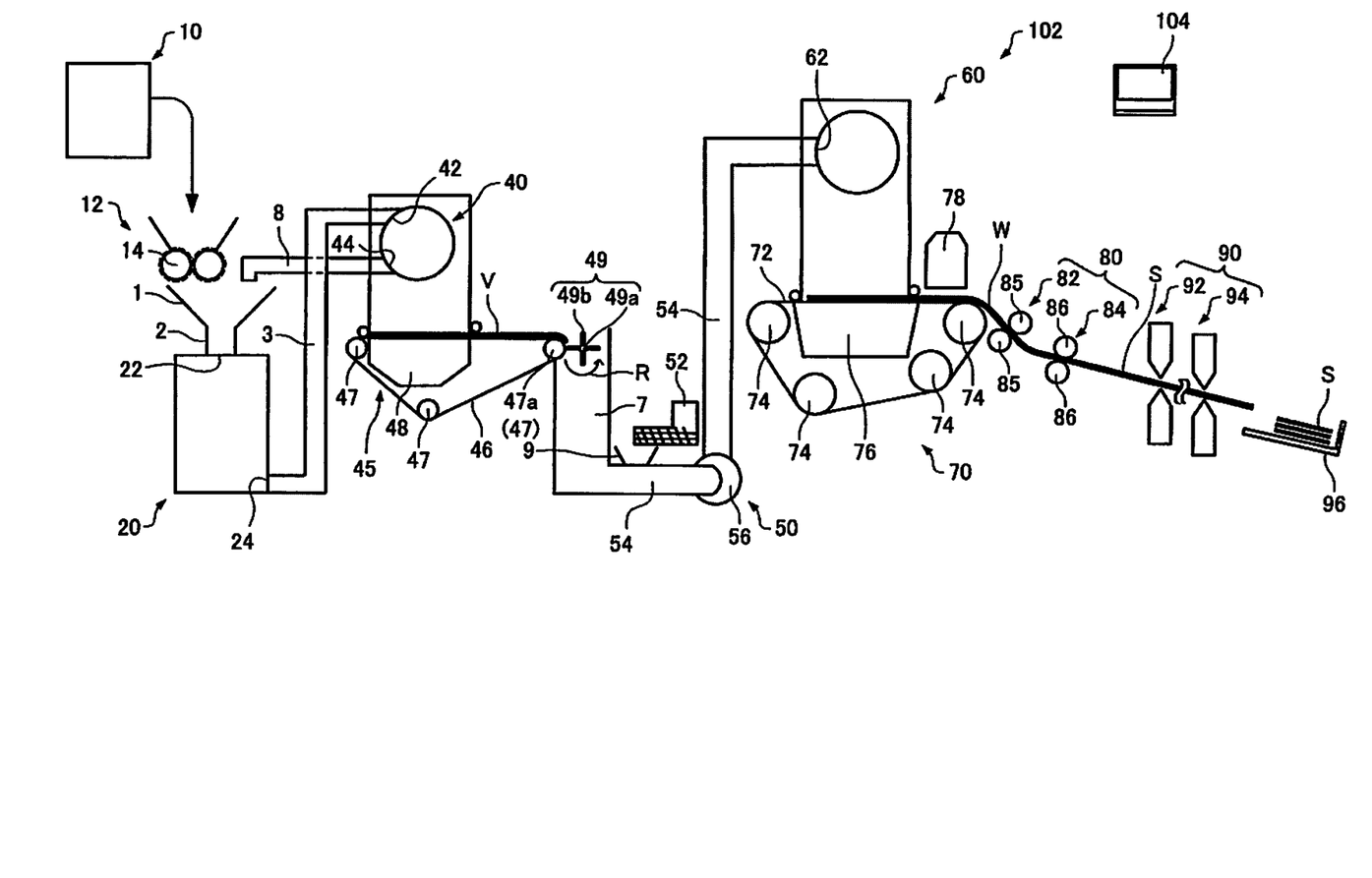
FIG. 1 illustrates a sheet manufacturing apparatus according to an embodiment of the invention.

A sheet manufacturing apparatus according to this embodiment is described below with reference to the accompanying figures. FIG. 1 schematically illustrates a sheet manufacturing apparatus 100 according to this embodiment.

As shown in FIG. 1, the sheet manufacturing apparatus 100 has a supply unit 10, manufacturing unit 102, and control unit 104. The manufacturing unit 102 manufactures sheets. The manufacturing unit 102 includes a shredder 12, defibrating unit 20, separator 40, first web forming unit 45, rotor 49, mixing unit 50, air-laying unit 60, second web forming unit 70, sheet forming unit 80, and cutting unit 90.

The supply unit 10 supplies feedstock to the shredder 12. The supply unit 10 is, for example, an automatic loader for continuously supplying feedstock material to the shredder 12. The feedstock supplied by the supply unit 10 includes fiber from recovered paper or pulp sheets, for example.

The shredder 12 cuts feedstock supplied by the supply unit 10 into shreds in a gas environment such as the atmosphere (air). The shreds in this example are pieces a few centimeters in size. In the example in the figure, the shredder 12 has shredder blades 14, and shreds the supplied feedstock by the shredder blades 14. In this example, a paper shredder is used as the shredder 12. The feedstock shredded by the shredder 12 is received into a hopper 1 and carried (conveyed) to the defibrating unit 20 through a conduit 2.

The defibrating unit 20 defibrates the feedstock shredded by the shredder 12. Defibrate as used here is a process of separating feedstock (material to be defibrated) comprising interlocked fibers into individual detangled fibers. The defibrating unit 20 also functions to separate particulate such as resin, ink, toner, and sizing agents in the feedstock from the fibers.

Material that has passed through the defibrating unit 20 is referred to as defibrated material. In addition to untangled fibers, the defibrated material may also contain resin particles (resin used to bind multiple fibers together), coloring agents such as ink and toner, sizing agents, paper strengthening agents, and other additives that are separated from the fibers when the fibers are detangled. The shape of the detangled defibrated material is a string or ribbon. The detangled, defibrated material may be separated from (not interlocked with) other detangled fibers, or may be in lumps interlocked with other detangled defibrated material (in so-called fiber clumps).

The defibrating unit 20 defibrates in a dry process in ambient air (air). More specifically, an impeller mill is used as the defibrating unit 20. The defibrating unit 20 can also create an air flow that sucks in the feedstock and then discharges the defibrated material. As a result, the defibrating unit 20 can suction the feedstock with the air flow from the inlet 22, defibrate, and then convey the defibrated material to the exit 24 using the air flow produced by the defibrating unit 20. The defibrated material that past the defibrating unit 20 is conveyed through a conduit 3 to the separator 40. Note that the air stream conveying the defibrated material from the defibrating unit 20 to the separator 40 may be the air current created by the defibrating unit 20, or a separate blower or other fan unit may be used to create the air current.

The separator 40 selects fibers by length from the defibrated material defibrated by the defibrating unit 20 that was introduced from the inlet 42. A sieve (sifter) is used as the separator 40. The separator 40 has mesh (filter, screen), and can separate fiber or particles that are smaller than the size of the openings in the mesh (that pass through the mesh, first selected material) from fiber, undefibrated shreds, and clumps that are larger than the openings in the mesh (that do not pass through the mesh, second selected material). For example, the first selected material is conveyed through a conduit 7 to the mixing unit 50. The second selected material is returned from the exit 44 through another conduit 8 to the defibrating unit 20. More specifically, the separator 40 is a cylindrical sieve that can be rotated by a motor. The mesh of the separator 40 may be a metal screen, expanded metal made by expanding a metal sheet with slits formed therein, or punched metal having holes formed by a press in a metal sheet.

The first web forming unit 45 conveys the first selected material from the separator 40 to the mixing unit 50. The first web forming unit 45 includes, for example, a mesh belt 46, tension rollers 47, and a suction unit (suction mechanism) 48.

The suction unit 48 suctions the first selected material that passed through the openings (mesh openings) in the separator 40 and was dispersed in air (air) onto the mesh belt 46.

The first selected material accumulates on the moving mesh belt 46, forming a web V. The basic configuration of the mesh belt 46, tension rollers 47, and suction unit 48 are the same as the mesh belt 72, tension rollers 74, and suction mechanism 76 of the second web forming unit 70 described below.

The web V is a soft, fluffy web containing a lot of air as a result of passing through the separator 40 and first web forming unit 45. The web V formed on the mesh belt 46 is fed into a conduit 7 and conveyed to the mixing unit 50.

The rotor 49 cuts the web V before the web V is conveyed to the mixing unit 50. In the example in the figure, the rotor 49 has a base 49a, and blades 49b protruding from the base 49a. The blades 49b in this example have a flat shape. In the example in the figure, there are four blades 49b, and the four blades 49b are equally spaced around the base 49a. By the base 49a turning in direction R, the blades 49b rotate on the axis of the base 49a. By cutting the web V with the rotor 49, variation in the amount of defibrated material per unit time supplied to the air-laying unit 60, for example, can be reduced.

The rotor 49 is disposed near the first web forming unit 45. In the example in the figure, the rotor 49 is disposed near a tension roller 47a (beside the tension roller 47a) located at the downstream side of the conveyance path of the web V. The rotor 49 is disposed at a position where the blades 49b can contact the web V but do not touch the mesh belt 46 on which the web V is laid. As a result, wear (damage) to the mesh belt 46 by the blades 49b can be suppressed. The minimum distance between the blades 49b and mesh belt 46 is preferably greater than or equal to 0.05 mm and less than or equal to 0.5 mm. for example.

The mixing unit 50 mixes an additive containing resin with the first selected material (the first selected material conveyed by the first web forming unit 45) that past the separator 40. The mixing unit 50 has an additive supply unit 52 that supplies additive, a conduit 54 for conveying the selected material and additive, and a blower 56. In the example in the figure, the additive is supplied from the additive supply unit 52 through a hopper 9 to a conduit 54. Conduit 54 communicates with conduit 7.

The mixing unit 50 uses the blower 56 to produce an air flow, and can convey while mixing the selected material and additives in the conduit 54. Note that the mechanism for mixing the first selected material and additive is not specifically limited, and may mix by means of blades turning at high speed, or may use rotation of the container like a V blender.

A screw feeder such as shown in FIG. 1, or a disc feeder not shown, for example, may be used as the additive supply unit 52. The additive supplied from the additive supply unit 52 contains resin for binding multiple fibers together. The multiple fibers are not bound when the resin is supplied. The resin melts and binds multiple fibers when passing the sheet forming unit 80.

The resin supplied from the additive supply unit 52 is a thermoplastic resin or thermoset resin, such as AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone. These resins may be used individually or in a desirable combination. The additive supplied from the additive supply unit 52 may be fibrous or powder.

Depending on the type of sheet being manufactured, the additive supplied from the additive supply unit 52 may also include a coloring agent for coloring the fiber, an anti-blocking agent to prevent fiber agglomeration, or a flame retardant for making the fiber difficult to burn, in addition to resin for binding fibers. The mixture (a mixture of first selected material and additive) that passes the mixing unit 50 is conveyed through a conduit 54 to the air-laying unit 60.

The mixture that past the mixing unit 50 is introduced from the inlet 62 to the air-laying unit 60, which detangles and disperses the tangled defibrated material (fiber) in a gas environment such as ambient air (air) while the mixture precipitates. When the resin in the additive supplied from the additive supply unit 52 is fibrous, the air-laying unit 60 also detangles interlocked resin fibers. As a result, the air-laying unit 60 can lay the mixture uniformly in the second web forming unit 70.

A cylindrical sieve that turns is used as the air-laying unit 60. The air-laying unit 60 has mesh, and causes fiber and particles smaller than the size of the mesh (that pass through the mesh) and contained in the mixture that past the mixing unit 50 to precipitate. The configuration of the air-laying unit 60 is the same as the configuration of the separator 40 in this example.

Note that the sieve of the air-laying unit 60 may be configured without functionality for selecting specific material. More specifically, the "sieve" used as the air-laying unit 60 means a device having mesh, and the air-laying unit 60 may cause all of the mixture introduced to the air-laying unit 60 to precipitate.

The second web forming unit 70 lays the precipitate that passed through the air-laying unit 60 into a web W. The web forming unit 70 includes, for example, a mesh belt 72, tension rollers 74, and a suction mechanism 76.

The mesh belt 72 is moving while precipitate that has passed through the holes (mesh) of the air-laying unit 60 accumulates thereon. The mesh belt 72 is tensioned by the tension rollers 74, and is configured so that air passes through but it is difficult for the precipitate to pass through. The mesh belt 72 moves when the tension rollers 74 turn. A web W is formed on the mesh belt 72 as a result of the mixture that past the air-laying unit 60 precipitating continuously while the mesh belt 72 moves continuously. The mesh belt 72 may be metal, plastic, cloth, or nonwoven cloth.

The suction mechanism 76 is disposed below the mesh belt 72 (on the opposite side as the air-laying unit 60). The suction mechanism 76 produces a downward flow of air (air flow directed from the air-laying unit 60 to the mesh belt 72). The mixture distributed in a gas (such as air) by the air-laying unit 60 can be pulled onto the mesh belt 72 by the suction mechanism 76. As a result, the discharge rate from the air-laying unit 60 can be increased. A downward air flow can also be created in the descent path of the mixture, and interlocking of defibrated material and additive during descent can be prevented, by the suction mechanism 76.

A soft, fluffy web W containing much air is formed by material passing through the air-laying unit 60 and second web forming unit 70 (web forming process) as described above. The web W laid on the mesh belt 72 is then conveyed to the sheet forming unit 80.

Note that a moisture content adjustment unit 78 for adjusting the moisture content of the web W is disposed in the example shown in the figure. The moisture content adjustment unit 78 adds water or water vapor to the web W to adjust the ratio of water to the web W.

The sheet forming unit 80 applies heat and pressure to the web W laid on the mesh belt 72, forming a sheet S. By applying heat to the mixture of defibrated material and additive contained in the web W, the sheet forming unit 80 can bind fibers in the mixture together through the additive (resin).

The sheet forming unit 80 includes a compression unit 82 that compresses the web W, and a heating unit 84 that heats the web W after being compressed by the compression unit 82. The compression unit 82 in this example comprises a pair of calender rolls 85 that apply pressure to the web W. Calendering reduces the thickness of the web W and increases the density of the web W. A heat roller (heating roller), hot press molding machine, hot plate, hot air blower, infrared heater, or flash fuser, for example, may be used as the heating unit 84. In the example in the figure, the heating unit 84 comprises a pair of heat rollers 86. By configuring the heating unit 84 with heat rollers 86, a sheet S can be formed while continuously conveying the web W, unlike when the heating unit 84 is configured with a flat press (flat press machine). The calender rolls 85 (compression unit 82) can apply greater pressure to the web W than the pressure that can be applied by the heat rollers 86 (heating unit 84). Note that the number of calender rolls 85 and heat rollers 86 is not specifically limited.

The cutting unit 90 cuts the sheet S formed by the sheet forming unit 80. In the example in the figure, the cutting unit 90 has a first cutter 92 that cuts the sheet S crosswise to the conveyance direction of the sheet S, and a second cutter 94 that cuts the sheet S parallel to the conveyance direction of the sheet S. In this example, the second cutter 94 cuts the sheet S after passing through the first cutter 92 (after being cut by the first cutter 92).

Cut sheets S of a specific size are formed by the process described above. The cut sheets S are then discharged to the discharge unit 96.

1.2. Fiber

The feedstock used in the sheet manufacturing apparatus 100 according to this embodiment is not specifically limited, and a wide range of fiber materials can be used. Examples of usable fiber includes natural fiber (animal fiber, plant fiber) and synthetic fiber (organic fiber, inorganic fiber, and blends of organic and inorganic fibers), and more specifically include fiber derived from cellulose, silk, wool, cotton, true hemp, kenaf, flax, ramie, jute, manila, sisal, softwood trees, and hardwood trees; fiber derived from rayon, Lyocell, cupro, Vinylon, acrylic, nylon, aramid, polyester, polyethylene, polypropylene, polyurethane, polyimide, carbon, glass, or metal; the fibers may be used alone, mixed with other fibers, or refined or otherwise processed as regenerated fiber. The fiber may also be dried, or it may contain or be impregnated with water, organic solvent, or other liquid. The feedstock may include recovered paper or recovered cloth including at least one of these types of fiber. The fiber may also be dried, or it may contain or be impregnated with water, organic solvent, or other liquid. Various types of surface processing may also be applied. The fiber material may also be pure, or a material containing other components, including impurities, additives, and other components.

The average diameter (when not round in section, the maximum length in the direction perpendicular to the length, or the diameter of a circle assuming a circle with the same area as the area in cross section (circle equivalent diameter)) of individual fibers used in this embodiment is, on average, greater than or equal to 1 µm and less than or equal to 1000 µm, preferably greater than or equal to 2 µm and less than or equal to 500 µm, and further preferably greater than or equal to 3 µm and less than or equal to 200 µm.

The length of fiber used in the sheet manufacturing apparatus 100 according to this embodiment is not specifically limited, and the length of a single individual fiber along the length of the fiber is greater than or equal to 1 µm and less than or equal to 5 mm, preferably greater than or equal to 2 µm and less than or equal to 3 mm, and further preferably greater than or equal to 3 µm and less than or equal to 2 mm. The shorter the length of the fiber, the more difficult it is for the fiber to bond with resin particles, and sheet strength may be insufficient for some applications, but sheets with sufficient strength can be achieved with fiber lengths in the above range. The average length of the fiber, expressed as the length-weighted mean length, is greater than or equal to 20 µm and less than or equal to 3600 µm, is preferably greater than or equal to 200 µm and less than or equal to 2700 µm, and further preferably greater than or equal to 300 µm and less than or equal to 2300 µm. There may be some variance (distribution) in fiber length, but the standard deviation σ of the length of a single individual fiber, in a normal distribution where n is greater than or equal to 100, is greater than or equal to 1 µm and less than or equal to 1100 µm, preferably greater than or equal to 1 µm and less than or equal to 900 µm, and further preferably greater than or equal to 1 µm and less than or equal to 600 µm.

Fiber thickness and length can be measured using various types of optical microscopes, scanning electron microscopes (SEM), and fiber testers.

In the sheet manufacturing apparatus 100 according to this embodiment, fiber feedstock is defibrated by the defibrating unit 20, passes through the separator 40, and is conveyed to the mixing unit 50 as first selected material.

1.3. Additives

The additive supplied from the additive supply unit 52 includes resin for binding fibers together. The resin may be mixed as a powder with other additives. At the time the additive is added, the fibers are not bound together. The resin melts when passing through the sheet forming unit 80, and binds fibers together. In this embodiment of the invention, the additive supplied from the additive supply unit 52 includes resin particles. The additive may comprise only resin particles, or be a mixture of resin particles with other materials.

Resin particles in this embodiment of the invention are supplied from the additive supply unit 52, and when passing the mixing unit 50 and air-laying unit 60, adhere to the fibers, are laid with the fiber on the mesh belt 72, and adhere to the fiber when laid in a web W.

The resin particles in this example include resin with a grindability index of less than or equal to 0.8, preferably less than or equal to 0.75, further preferably less than or equal to 0.71, and further preferably less than or equal to 0.7. The lower limit of the grindability index of the resin contained in the resin particles is not specifically limited, but is greater than or equal to 0.001, and preferably greater than or equal to 0.01, because of the increase in production cost if the resin is too difficult to grind under the manufacturing conditions of the resin particles. Note that the value of the grindability index of the resin in the invention is an index of the ease of grinding, or the difficulty of grinding, under specific conditions, and is a value that is not necessarily correlated to grindability under the grinding conditions during manufacture.

The grindability index of the resin may be measured as described below. (1) A 3 kg block of resin is crushed by a hammer into approximately 5 mm pieces. (2) The crushed resin is loaded into a feather mill (FM-1S, Hosokawa Micron); standard hammers (16) and a screen with 10 mm diameter mesh installed; and the resin ground at 900 rpm to pass all resin through #8 mesh (2.36 mm openings). (3) Into a Waring blender (7012S, Osaka Chemical) with a stainless steel vessel (CAC33) and a cutter (SS1100) is added 150 g of resin particles, and processed with for 60 sec with the cutter turning at 13,000 rpm. (4) The processed resin is then passed through #12 mesh (1.4 mm openings); 70 g of the particles that past the mesh measured and introduced to a high speed mill (HS-10, Scenion Inc.), standard grinding blades installed, and the resin particles then processed for three continuous cycles of 30 sec at 30,000 rpm followed by a 180 sec rest between cycles. (5) M (g) of processed resin is then measured and loaded into a #32 mesh sieve (200 mm openings) (JIS standard), the sieve attached to a vibratory sieve shaker (AS200, AS ONE Corp.), and sieved for 20 min at a 2 mm amplitude. (6) The weight R (g) of the residue on the #32 mesh (500 μm openings) sieve (the amount left in the sieve) was then measured, and the grindability index D calculated as D=(M−R)/M.

The grindability index D is in the range 0<=D<=1, where a higher D indicates better grindability. M can be selected as desired, but is preferably in the range of greater than or equal to 10 (g) and less than or equal to 50 (g), and desirably 30 (g), for example. (7) The above operation is repeated three times to determine the mean grindability index D.

To accurately measure the weight R of resin left in the sieve, the residue R is preferably measured by measuring the weight change in the complete system before and after sieving. A more accurate measurement can be made by using an antistatic brush to gently brush off the resin adhering by static electricity to the bottom of the sieve before measuring the weight of the system after sieving. Note that the grindability index may be calculated by measuring the weight of the resin that past the sieve. Because accurately measuring the weight of resin adhering to the bottom side of the sieve is difficult in this case, the grindability index is normally measured using the residue.

By using resin with a grindability index D of 0.8 or less, the resin resists breaking down (failure) when the resin melts and binds fibers, and a sheet with high mechanical strength can be made.

The grindability index D is measured (calculated) as described above, but the grinding conditions when grinding to produce resin particles (additive) for use in the sheet manufacturing apparatus 100 normally differ from the grinding conditions for measuring the grindability index D. The resin particles in this embodiment are acquired by the structure, materials and method described below.

The resin particles may be commercially available resin in powder form (resin powder). Commercially available resin pellets that have been ground (pulverized) may also be used as the resin particles. Various types of resin may also be mixed (blended) and ground to acquire the resin particles, or further granulated and ground. The resin particles may also be classified after grinding.

The method of grinding the resin particles is not specifically limited, and known methods may be used, including using an FM mixer, Henschel mixer, super mixer, turbo mill, roller mill, jet mill, hammer mill, or pin mill. The grinding process may also be done while cooling the resin. When grinding the resin (when making the resin particles), the resin may also be mixed with other materials, and grinding may be combined with making the additive.

The particle diameter of the resin particles (volume mean particle diameter) is preferably less than or equal to 50 μm, further preferably less than or equal to 30 μm, further preferably less than or equal to 25 μm, and yet further preferably less than or equal to 20 μm. When the mean particle diameter is small, the effect of gravity on the resin particles decreases, separation of resin particles from the fibers due to the weight of the resin particles can be suppressed, and because air resistance decreases, separation of resin particles from the fibers due to the air flow (current) produced by the suction mechanism 76 can be suppressed, and separation due to mechanical vibration can be suppressed. Furthermore, if the resin particles are in the above range, separation from the fiber can be made sufficiently difficult, and fibers can be bonded.

The size of the openings in the mesh belt 72 may be desirably set, but because the resin particles adhere to the fibers, resin particles passing through the mesh belt 72 can be suppressed even if the diameter of the resin particles is smaller than the openings (the size of the holes through which material passes) in the mesh belt 72. In other words, the particle diameter of the resin particles in this example may be smaller than the openings in the mesh belt 72.

The lower limit of the mean particle diameter of the particles in the resin powder is not specifically limited, in this example is 10 μm, and may be desirably set in a range that can be produced by grinding or other method. The mean particle diameter of the particles in the resin powder may also have a distribution. When the distribution of the particle diameter of the particles in the resin powder is large, coarse particles and fine particles may be removed by a classifier. Because fine resin particles can easily collect in lumps, an anti-blocking agent (such as titanium oxides particles) may be used when such resin powder is included, or resin powder may be removed by a classifier.

The volume mean particle diameter of particles in the resin powder can be measured using a particle counter using laser diffraction analysis, for example. One example of a suitable particle counter is a dynamic light scattering particle counter (such as the Microtrac UPA, Nikkiso).

1.3.2. Resin Particle Materials

The material of the resin contained in the resin particles used in the sheet manufacturing apparatus according to this embodiment is not specifically limited insofar as the grindability index D of the resin particles is 0.8 or less. The grindability index D is a powder mechanics, or mechanical (macroscopic), property, is not a property that derives directly (that can be explained directly) from the molecular structure of the resin, and is a complex, comprehensive value that depends at least on the type (molecular structure), molecular weight, composition, and phase separation of the resin. Different values are therefore possible depending upon the type of resin, and different values may be obtained from the same type of resin. Because the properties of only one of the resins will rarely determine the grindability index in a blend of multiple resins, the grindability index is usually determined by measuring.

The type of resin (a component of the resin particles) that is a constituent of the resin powder may be a thermoplastic resin or thermoset resin, including, for example, AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone. These resins may be use alone or mixed.

More specifically, the type of resin (a component of the resin particles) that is a constituent of the resin powder may be a natural resin or synthetic resin, and may be a thermoplastic resin or thermoset resin. In the paper manufacturing apparatus 100 according to this embodiment, the resin in the resin powder is preferably a solid at room temperature, and considering bonding the fibers by heat in the sheet forming unit 80, and recycling the manufactured sheet, is preferably a thermoplastic resin.

Examples of natural resins include rosin, dammar, mastic, copal, amber, shellac, Dragon's blood, sandarac, and colophonium, which may be used individually or in appropriate mixtures, and may be appropriately denatured.

Examples of synthetic resins that are a thermoset resin include thermosetting resins such as phenol resin, epoxy resin, melamine resin, urea resin, unsaturated polyester resin, alkyd resin, polyurethane, and thermoset polyimide resin.

Examples of synthetic resins that are thermoplastic resin include AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone.

The resins may also be copolymerized or modified, examples of such resins including styrene-based resin, acrylic-based resin, styrene-acrylic copolymers, olefin-based resin, vinyl chloride-based resin, polyester-based resin, polyamide-based resin, polyurethane-based resin, polyvinyl alcohol-based resin, vinyl ether-based resin, N-vinyl-based resin, and styrene-butadiene-based resin.

While examples of the resin material are given above, bisphenols such as bisphenol A (BPA) and reactants thereof are preferably not included. An example of a reactant of bisphenol compounds include bisphenol A—alkylene oxide adducts, and such monomers are preferably not included. By the resin not containing bisphenols, the production of endocrine disruptors through deterioration can be suppressed. The production of formalin and phenols can also be suppressed. Furthermore, the grindability index D can be reduced by not including bisphenol compounds.

BPA-free polyester is desirable as a resin material. Examples of BPA-free polyester include, as an acid component, dicarboxylic acids such as isophthalic acid, terephthalic acid, maleic acid, oxalic acid, malonic acid, succinic acid, glutaric acid, adipic acid, sebacic acid; polyvalent carboxylic acids such as trimellitic acid; anhydrides of these, and mixtures of the foregoing. The alcohol component in this case may include alkylenediols such as ethylene glycol and 1,4-butanediol; polyhydric alcohols such as glycerine and pentaerythritol; and oligoalcohols such as alkylene oxide diols. BPA-free polyesters have a low environmental impact and are thermoplastic, and sheets made with BPA-free polyesters can be easily recycled.

BPA-free polyesters have excellent malleability and afford a low grindability index D. BPA-free polyesters with a low grindability index D do not easily fail (break) when a load is applied to at powder form, and tend to break when stretched a certain amount. As a result, BPA-free polyesters effectively improve sheet strength.

Because the grindability index of the resin contained in the resin powder is 0.8 or less in this embodiment of the invention, the resin is resistant to being broken down by external forces. Resin in the manufactured sheet S is therefore difficult to destroy. As a result, a sheet S with good mechanical strength can be manufactured.

1.3.3. Other Components

A coloring agent for coloring the fiber, or a flame retardant for making the fiber difficult to burn, may be included in the resin powder (additive) as described above, and at least one of these may be easily combined with the resin by a melt-kneading process. After forming the resin powder, inorganic fine particles can be intermixed by mixing the resin powder with an inorganic fine particle powder in a high speed mixer.

The resin powder (additive) may also contain other components. Examples of other components include coloring agents, anti-blocking agents, antistatic agents, charge control agents, organic solvent, surfactants, fungicide and preservatives, anti-oxidants, ultraviolet absorbers, and oxygen absorbers. These components may be integrated with the resin powder, or mixed with the additive as discrete components.

The fiber and resin powder are mixed in the mixing unit 50, and the mixture ratio of these components can be adjusted according to the desired strength and application of the manufactured sheet S. The ratio of resin powder to fiber is preferably greater than or equal to 5 wt % and less than or equal to 70 wt %, and is further preferably greater than or equal to 5 wt % and less than or equal to 50 wt % considering better mixing in the mixing unit 50 and greater resistance to the loss of the resin powder due to gravity when the mixture is formed in a sheet.

1.4. Mixing Unit

The mixing unit 50 of the sheet manufacturing apparatus 100 according to this embodiment functions to mix the fiber and additive. At least fiber and resin powder are mixed in the mixing unit 50. Components other than fiber and resin powder may also be mixed in the mixing unit 50. In this embodiment, mixing fiber and resin powder means placing resin powder (additive) between the fibers within a space (system) of a specific volume.

The mixing process of the mixing unit 50 is a (dry) method of introducing fiber and resin powder to an air stream and mixing the fiber and resin powder in the air stream, and is a fluid dynamic mixing process. Dry mixing means that materials are mixed in air, such as ambient air (air), and not in water. More specifically, the mixing unit 50 may function in a dry state, or it may function in a state containing liquid as an impurity or liquid that is intentionally added. When liquid is added intentionally, it is preferably added to the extent that the energy and time required to remove the liquid by heating or other process in a subsequent process is not too great. When using this method, the air stream in the conduit 54, for example, is preferably turbulent because mixing efficiency is greater.

The processing capacity of the mixing unit 50 is not specifically limited insofar as the fiber (fiber material) and resin powder can be mixed, and can be appropriately designed and adjusted according to the production capacity (throughput) of the sheet manufacturing apparatus 100. The processing capacity of the mixing unit 50 can be adjusted by, for example, adjusting the flow rate, the amount of material added, and the carrying capacity of the gas conveying the fiber and resin powder inside the conduit 54.

The mixture combined in the mixing unit 50 may be further mixed by the air-laying unit 60 or other configuration. In the example in FIG. 1, the mixing unit 50 has a blower 56 disposed to the conduit 54, but may also have other blowers not shown.

A blower is a machine for mixing the fiber and resin powder, and has a rotor with blades that turn. As the blades turn, the fiber and/or resin powder collide with the blades and made to rub against each other together by the blades. As the blades turn, the air current created by the blades causes fiber and fiber, fiber and resin powder, and/or resin powder and resin powder, to collide and rub against each other.

Such collisions and friction charge (electrostatically charge) at least the resin powder, and conceivably produces adhesion force (electrostatic force) causing resin powder to adhere to the fibers. The strength of these bonds depends on the properties of the fiber and resin powder, and the construction of the blower (the shape of the rotating blades). As shown in FIG. 1, sufficient adhesion force can be created with a single blower 56, but even stronger adhesion force can be achieved by disposing another blower on the downstream side of the additive supply unit 52. The number of blowers added is not specifically limited. Furthermore, when multiple blowers are used, the primary function of each blower may differ, such as by providing a blower that produces a stronger air flow, and a blower with greater mixing force (electrostatic charging capacity). This enables strengthening the adhesion force of the resin powder to fiber, and can better suppress separation of the resin powder from between the fibers when forming the web W.

1.5. Operating Effect

The sheet manufacturing apparatus 100 according to this embodiment makes a sheet S using a resin powder containing resin with a grindability index of 0.8 or less. Because such resin is difficult to crush by external force, the resin in the manufactured sheet S is also not easily destroyed.

As a result, a sheet S with good mechanical strength can be made.

2. Sheet Manufacturing Method

The sheet manufacturing method of the invention includes a mixing process of mixing fiber and resin powder in air; a sheet forming process of laying and heating the mixture from the mixing process to form a sheet; and the grindability index of the resin in the resin powder is 0.8 or less. The fiber and resin powder (additive) are as described in the sheet manufacturing apparatus above, and further description thereof is omitted.

The sheet-making method in this embodiment of the invention includes at least one process selected from a group of processes including: a process of cutting pulp sheet, recovered paper, or other feedstock in air; a defibrating process of breaking the feedstock into fibers in air; an air classification process of separating from the defibrated material that was defibrated impurities (toner, paper strengthening agents) and fibers that were shortened by defibration (short fibers); a separation process of separating from the defibrated material, in air, long fibers (long fiber) and undefibrated paper particles that were insufficiently defibrated; a distribution process of suspending and causing the mixed material to precipitate in air; a forming process of laying the precipitated mixed material in air in the shape of a web; a drying process of drying the sheet as required; a winding process of winding the formed sheet into a roll; a cutting process of cutting the formed sheet; and a packaging process of packaging the manufactured sheets. These processes are described in the sheet manufacturing apparatus above, and further detailed description is omitted.

This sheet manufacturing method enables making sheets S using resin powder containing resin with a grindability index of 0.8 or less. Because such resin is difficult to break by external force, the resin also does not fail easily in the manufactured sheet S. As a result, a sheet S with good mechanical strength can be made.

3. Sheet

The sheet S manufactured by the sheet manufacturing apparatus 100 and sheet manufacturing method according to this embodiment is made by forming feedstock including at least fiber as described above into a sheet. However, the sheet S is not limited to paper sheets, and may be paperboard, a web, or textured forms, for example. Sheets as used herein include paper and nonwoven cloth. Paper includes products manufactured as sheets from pulp or recovered paper as the feedstock, and includes recording paper for handwriting or printing, wall paper, wrapping paper, construction paper, drawing paper, bristol, and thick paper as used in paper containers and paper boxes. Nonwoven cloth is thicker and weaker than paper, and includes common nonwoven cloth, fiberboard, tissue paper, kitchen paper, vacuum filter bags, filters, fluid (waste ink, oil) absorbers, sound absorbers, cushioning materials, and mats. The spaces between fibers are large (sheet density is low) in nonwoven cloth. In paper, the spaces between fibers are small (sheet density is high). As a result, when the sheet S manufactured by the sheet manufacturing apparatus 100 and sheet manufacturing method according to this embodiment is paper, the effect and function of suppressing separation of resin powder from fiber, and achieving uniform strength in the resulting sheet, are more prominent.

The form of a sheet according to this embodiment is as described above, but a sheet according to the invention preferably includes fiber and a BPA-free polyester resin, where the grindability index of the BPA-free polyester resin is 0.8 or less. Because this sheet contains resin with a grindability index of 0.8 or less, mechanical strength is better than the mechanical strength of a sheet containing the same amount of a different resin. Furthermore, the environmental impact can be reduced by including a BPA-free polyester resin.

4. Other Notes

The sheet manufacturing apparatus and sheet manufacturing method of the foregoing embodiments use little to no water, but can manufacture sheets by adding an appropriate amount of water by misting to adjust the moisture content, for example.

The water may be pure water or ultrapure water such as deionized water, ultrafiltered water, reverse osmosis water, or distilled water. Water that has been sterilized by UV radiation or adding hydrogen peroxide to any of these types of water is particularly preferable because the growth of algae and bacteria can be suppressed for a long time.

"Uniform" as used herein means, in the case of a uniform dispersion or mixture, that the relative positions of one component to another component in an object that can be defined by components of two or more types or two or more phases are the same throughout the whole system, or identical or effectively equal in each part of a system. Uniformity of coloring or tone means there is no gradation in color and color density is the same when looking at the sheet in plan view.

Words meaning uniform, same, equidistant and similar terms meaning that density, distance, dimensions, and similar terms are equal are used herein. These are preferably equal, but include values deviating without being equal by the accumulation of error, deviation, and such because complete equality is difficult.

5. Test Samples

The invention is further described below with reference to test samples, but the invention is not limited by the following samples in any way.

5.1. Resin Making

To a 5000 ml four-necked flask were connected a reflux condenser, water separator, nitrogen feed tube, thermometer, and mixer. A 3500 g mixture of acid and alcohol at the mole ratios shown in Table 1 was first put into the flask. After adding 3 g of dibutyltin oxide, esterification proceeded in a nitrogen atmosphere at 200° C. for 3 hours.

The product of the esterification reaction was then moved to a 5000 ml autoclave to produce polyester resins A to I in Table 1 by a polycondensation reaction for 4 hours at 245° C. and an internal pressure of 300 Pa.

TABLE 1

| | | Resin type | | | | | | | | |
|---|---|---|---|---|---|---|---|---|---|---|
| | | A | B | C | D | E | F | G | H | I |
| Acid component | anhydride trimellitic acid | 7 | 10 | 9 | 9 | 12 | 6 | 1 | 1 | 3 |
| | terephthalic acid | 26 | 26 | 26 | 27 | 27 | 31 | 24 | 27 | 30 |
| | isophthalic acid | 14 | 11 | 14 | 16 | 15 | 17 | 24 | 22 | 9 |
| Alcohol component | 1,4-butanediol | 29 | 29 | 27 | 25 | 29 | 28 | 26 | 30 | 29 |
| | ethylene glycol | 24 | 24 | 23 | 21 | 15 | 14 | 25 | 20 | 29 |
| | pentaerythritol | — | — | 1 | 2 | 2 | 4 | — | — | — |

Monomer content of resins (mole fraction)

5.2. Resin Powder Production

The resulting resin blocks were then broken with hammers into approximately 6 mm diameter pieces. The resin pieces were further pulverized by a feather mill to approximately 2 mm granules. The granules were then ground in a jet mill, and classified to remove particles less than or equal to 5 μm and greater than or equal to 40 μm to obtain resin powder with an average particle diameter of 10 μm. To the resulting resin powder was added 1.5 wt % fumed silica (as an anti-blocking agent), and mixed in a Henschel mixer to acquire the resin powder (additive) for making sheets.

5.3. Measuring Resin Powder Properties

5.3.1. Glass Transition Temperature

The glass transition temperature (Tg) was measured using a differential scanning calorimeter (DSC220C, Seiko Instruments). Each sample was measured twice at a temperature rise of 10° C./min, and the intersection of the baseline of the DSC curve in the second measurement, and the tangent to the inflection point of the same curve, was obtained as the glass transition point (glass transition temperature (Tg)). The resulting values are shown in Table 3.

5.3.2. Measuring the Softening Temperature

The softening temperature was measured using a flow tester (CFT-500, Shimadzu Seisakusho). Using a 1-mm thick die with a 1-mm hole, under a 20 kgf load and a temperature rise of 5° C./min, the temperature at which ½ of a 1.1 g sample past through was obtained as the softening temperature. The results are shown in Table 3.

5.3.3. Measuring Resin Acid Value

The acid value of the resin was measured according to JIS K2501: 2003 (Petroleum products and lubricants—Determination of neutralization number). The results are shown in Table 3.

5.3.4. Measuring Grindability Index

A 3 kg block of resin from each sample was crushed by a hammer into approximately 5 mm pieces. The crushed resin was then loaded into a feather mill (FM-1S, Hosokawa Micron); standard hammers (16) and a screen with 10 mm diameter mesh installed; and the resin ground at 900 rpm to pass all resin through #8 mesh (2.36 mm openings). Into a Waring blender (7012S, Osaka Chemical) with a stainless steel vessel (CAC33) and a cutter (SS1100) was added 150 g of resin particles, and processed with for 60 sec with the cutter turning at 13,000 rpm. The processed resin was then passed through #12 mesh (1.4 mm openings); 70 g of the particles that past the mesh measured and introduced to a high speed mill (HS-10, Scenion Inc.), standard grinding blades installed, and the resin particles then processed for three continuous cycles of 30 sec at 30,000 rpm followed by a 180 sec rest between cycles. M (g) of processed resin was then measured and loaded into a #32 mesh sieve (200 mm openings) (JIS standard), the sieve attached to a vibratory sieve shaker (AS200, AS ONE Corp.), and sieved for 20 min at a 2 mm amplitude. The weight R (g) of the residue on the #32 mesh (500 μm openings) sieve (the amount left in the sieve) was then measured, and the grindability index D calculated as $D=(M-R)/M$. M at this time was 30 g. This operation was performed three times for each resin, and the average grindability index D of each resin obtained. The results are shown in Table 3.

5.3.5. Sheet Production and Strength Measurement

Materials of the following weight were put into the stainless steel vessel of a Waring blender (7012S, Osaka Chemical).

(1) Northern bleached softwood kraft (NBSK) 16 g
(2) resin for making sheets (from Table 1) 4 g The container was then closed, the blade speed set to 3400 rpm, and the resin and pulp mixed for 45 seconds to obtain a resin and pulp mixture.

The mixture was then moved to a #10 mesh sieve, and sieved onto a flat panel. The accumulated mixture was then heated and compressed for 30 seconds at 150° C. by a flat press with the pressure applied to the mixture adjusted to 15 MPa, and then cooled to acquire a sheet of resin and pulp. The grammage and thickness of the sheets are shown in Table 2. The average thickness of the sheets was 125 μm, and the average density was 0.8 g/cm³.

TABLE 2

Sheet properties

| | Sample | | | | | | | | |
|---|---|---|---|---|---|---|---|---|---|
| | 1 | 2 | 3 | 4 | 5 | 6 | 7 | 8 | 9 |
| | Resin type | | | | | | | | |
| | A | B | C | D | E | F | G | H | I |
| Resin content (wt %) | 20 | 20 | 20 | 20 | 20 | 20 | 20 | 20 | 20 |
| Sheet grammage (g/m²) | 123 | 117 | 115 | 117 | 113 | 121 | 126 | 122 | 114 |
| Sheet thickness (avg in each sheet) (μm) | 96 | 87 | 91 | 94 | 81 | 97 | 99 | 91 | 90 |

The resulting sheets were then cut into test samples 25 mm by 150 mm. The test samples were placed in a tensile tester (AGS-X, Shimadzu Seisakusho) disposed in a constant temperature chamber of 23° C., and tensile strength was tested at 2 mm/min. Tensile strength is the stress corresponding to the maximum force applied in the test, and was read from a tensile test chart. The resulting values are shown in Table 3.

TABLE 3

| | | Results | | | | | | | | |
|---|---|---|---|---|---|---|---|---|---|---|
| | | Sample | | | | | | | | |
| | | 1 | 2 | 3 | 4 | 5 | 6 | 7 | 8 | 9 |
| Resin evaluation | Glass transition temperature (° C.) | 69 | 80 | 82 | 82 | 81 | 83 | 62 | 53 | 24 |
| | Softening temperature (° C.) | 133 | 156 | 167 | 188 | 195 | 169 | 124 | 114 | 48 |
| | Acid value (mgKOH/g) | 9 | 11 | 11 | 9 | 12 | 1 | 1 | 2 | 10 |
| | Grindability index D | 0.71 | 0.59 | 0.45 | 0.23 | 0.04 | 0.33 | 0.97 | 0.96 | 0.91 |
| Sheet evaluation | Tensile strength (MPa) | 16 | 25 | 26 | 32 | 35 | 27 | 12 | 8 | 7 |
| | Practical strength | ○ | ○ | ○ | ○ | ○ | ○ | X | X | X |

5.4. Results

The sheet strength acceptable for practical use differs according to the application, but in the case of paper boxes or paper containers, sufficient strength for practical use is approximately 15 MPa. Samples with a strength rating of 15 MPa or more are marked with an O in Table 3, and samples with a strength rating less than 15 MPa are marked with an X.

The results in Table 3 show a correlation between tensile strength and grindability index D. The grindability index D is considered an indicator of the ease of resin breakdown when a constant load is applied to the resin. Resin with a high grindability index D breaks more easily under a smaller load. A correlation between the tensile strength of the sheet and the acid value of the resin was not observed.

A weak correlation was observed between the tensile strength of the sheet and the glass transition temperature and the softening temperature of the resin. In the case of a polyester resin, this tendency is believed to result from a correlation between tensile strength and molecular weight, and the grindability index is thought to be an index more sensitive to tensile strength.

In a sheet made from resin and fiber, sheet strength results from adhesion between the fiber and resin. When force causing deformation of the sheet is applied, tears in the sheet are believed to result from destruction of the bonds with the resin and the bonds separating, from the fibers breaking, or from separation at the resin-fiber interface.

A clear relationship between the grindability index D and tensile strength is observed in Table 3. More specifically, sheet strength is affected by the grindability index D of the resin, and the mechanical strength of sheets made with resin having a low grindability index D is higher. As shown in Table 3, strength sufficient for practical use is achieved when the grindability index D is less than approximately 0.8.

The present invention is not limited to the embodiment described above, and can be varied in many ways. For example, the invention includes configurations (configurations of the same function, method, and effect, or configurations of the same objective and effect) that are effectively the same as configurations described in the foregoing embodiment. The invention also includes configurations that replace parts that are not essential to the configuration described in the foregoing embodiment. Furthermore, the invention includes configurations having the same operating effect, or configurations that can achieve the same objective, as configurations described in the foregoing embodiment. Furthermore, the invention includes configurations that add technology known from the literature to configurations described in the foregoing embodiment.

REFERENCE SIGNS LIST 1 hopper
2, 3, 7, 8 conduit
9 hopper
10 supply unit
12 shredder
14 shredder blades
20 defibrating unit
22 inlet
24 exit
40 separator
42 inlet
44 exit
45 first web forming unit
46 mesh belt
47, 47a tension rollers
48 suction unit
49 rotor
49a base
49b wings
50 mixing unit
52 additive supply unit
54 conduit
56 blower
60 air-laying unit
62 inlet
70 second web forming unit
72 mesh belt
74 tension rollers
76 suction mechanism
78 moisture content adjustment unit
80 sheet forming unit
82 compression unit
84 heating unit
85 calender rolls
86 heat rollers

90 cutting unit
92 first cutter
94 second cutter
96 discharge unit
100 sheet manufacturing apparatus
102 manufacturing unit
104 control unit
S sheet
V, W web The entire disclosure of Japanese Patent Application No: 2015-134134, filed Jul. 3, 2015 is expressly incorporated by reference herein.

The invention claimed is:

1. A sheet manufacturing method comprising:
   a mixing step of mixing fiber and resin powder in air; and
   a sheet forming step of forming a sheet by laying and heating the mixture mixed in the mixing step;
   the grindability index of the resin contained in the resin powder being 0.8 or less.

2. The sheet manufacturing method described in claim 1, wherein:
   the volume mean particle diameter of the resin powder is 20 µm or less.

3. A sheet containing fibers, and a BPA-free polyester resin, the BPA-free polyester resin having a grindability index of 0.8 or less,
   the fibers being bonded to each other through the BPA-free polyester resin.

* * * * *